United States Patent
Kwatra et al.

(10) Patent No.: US 11,630,680 B2
(45) Date of Patent: Apr. 18, 2023

(54) MODIFYING USER INTERFACE LAYOUT BASED ON USER FOCUS

(71) Applicant: International Business Machines Corporation, Armonk, NY (US)

(72) Inventors: Shikhar Kwatra, San Jose, CA (US); Liam S Harpur, Dublin (IE); Zachary A Silverstein, Austin, TX (US); Craig M Trim, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 17/082,382

(22) Filed: Oct. 28, 2020

(65) Prior Publication Data
US 2022/0129285 A1 Apr. 28, 2022

(51) Int. Cl.
| | |
|---|---|
| G06F 3/048 | (2013.01) |
| G06F 9/451 | (2018.01) |
| G06F 3/01 | (2006.01) |
| G06N 20/00 | (2019.01) |
| G06F 16/957 | (2019.01) |
| G06Q 30/0241 | (2023.01) |
| G06F 3/0481 | (2022.01) |

(52) U.S. Cl.
CPC .............. *G06F 9/451* (2018.02); *G06F 3/012* (2013.01); *G06F 3/013* (2013.01); *G06F 3/0481* (2013.01); *G06F 16/9577* (2019.01); *G06N 20/00* (2019.01); *G06Q 30/0277* (2013.01)

(58) Field of Classification Search
CPC ........ G06F 3/0481; G06F 3/013; G06F 3/012; G06F 16/9577; G06F 9/451; G06N 20/00
See application file for complete search history.

(56) References Cited

U.S. PATENT DOCUMENTS

| | | | | |
|---|---|---|---|---|
| 10,360,254 | B1* | 7/2019 | Knas | G06F 3/012 |
| 10,775,882 | B2* | 9/2020 | Krasadakis | G06V 40/193 |
| 10,776,827 | B2* | 9/2020 | Ahuja | H04W 4/80 |
| 11,269,403 | B2* | 3/2022 | Patel | H04N 21/6581 |
| 2007/0174291 | A1 | 7/2007 | Cooper | |
| 2008/0098420 | A1 | 4/2008 | Khivesara | |
| 2008/0201222 | A1* | 8/2008 | Lahaix | G06Q 30/0269 |
| | | | | 705/14.66 |
| 2009/0299817 | A1 | 12/2009 | Fok | |

(Continued)

OTHER PUBLICATIONS

Damaskinidis et al. Eye-tracking the semiotic effects of layout on viewing print advertisements. Public Journal of Semiotics. Published Date: Aug. 22, 2018.

*Primary Examiner* — Rashawn N Tillery
(74) *Attorney, Agent, or Firm* — Jeffrey S LaBaw; Erik Johnson

(57) ABSTRACT

A method, apparatus and computer program product for modifying a user interface in a web browsing session is described. During a learning session with a first user, a user model is created. The user model includes associating user movement of the first user with a set of user focus types. During the web browsing session with the first user, the system determines that a first user focus of the set of user focus types in the user model is appropriate to modify a web application user interface to present a priority user interface element in the user interface. The web application user interface is modified according to the first user focus.

20 Claims, 10 Drawing Sheets

| SESSION# | CURRENT USER FOCUS | CONTENT BLINDNESS? | MODEL USED | RECOMMENDED USER FOCUS | MOVEMENT RECOMMEND- ATION |
|---|---|---|---|---|---|
| 2287 | VISUAL | YES | 668SD97 | AUDITORY DIGITAL (INTERNAL SELF TALK) | CARTESIAN (2,-3,6) |
| 2287 (45 SEC) | AUDITORY | YES | 678AD5 | VISUAL REMEMBERED | CARTESIAN (-5,-3,9) |
| 2287 (103 SEC) | AUDITORY CONSTRUCTED | YES | 678AD5 | AUDITORY DIGITAL (INTERNAL SELF TALK) | CARTESIAN (2,-3,6) |
| 6432 | VISUAL CONSTRUCTION | NO | 668SD97 | N/A | N/A |
| 6432 (89 SEC) | KINESTHETIC REMEMBERED | YES | 668SD97 | AUDITORY CONSTRUCTED | CARTESIAN (9,-24,8) |

(56) References Cited

U.S. PATENT DOCUMENTS

| | | | |
|---|---|---|---|
| 2010/0332315 A1* | 12/2010 | Kamar | G06Q 30/0254 |
| | | | 705/14.46 |
| 2012/0212484 A1 | 8/2012 | Haddick | |
| 2013/0305170 A1 | 11/2013 | de Souza | |
| 2014/0092006 A1 | 4/2014 | Boelter | |
| 2016/0012475 A1 | 1/2016 | Liu | |
| 2016/0225012 A1* | 8/2016 | Ha | G06Q 30/0277 |
| 2017/0046814 A1 | 2/2017 | Bostick | |
| 2017/0053452 A1* | 2/2017 | Arai | G02B 27/0093 |
| 2018/0004383 A1* | 1/2018 | Iwami | H04N 21/43637 |
| 2018/0314980 A1* | 11/2018 | Osotio | G06F 3/048 |
| 2018/0329727 A1* | 11/2018 | Cao | G06F 9/451 |
| 2020/0126536 A1* | 4/2020 | Farivar | G06F 3/167 |

* cited by examiner

WHAT COLOR IS YOUR CAR?
501
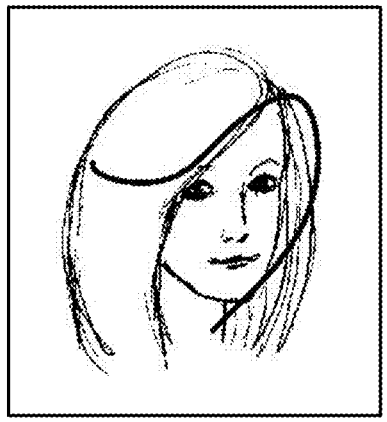 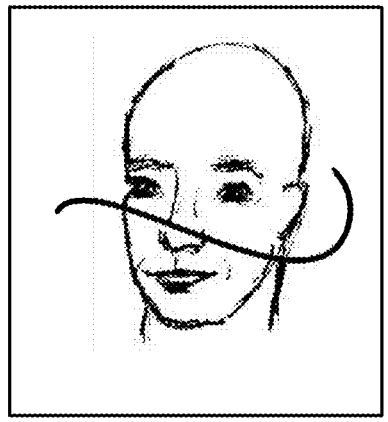
WHAT DOES A PINE CONE FEEL LIKE?
503
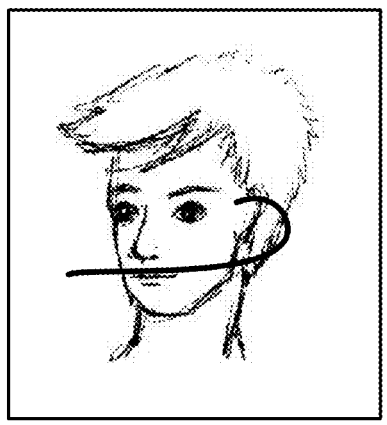 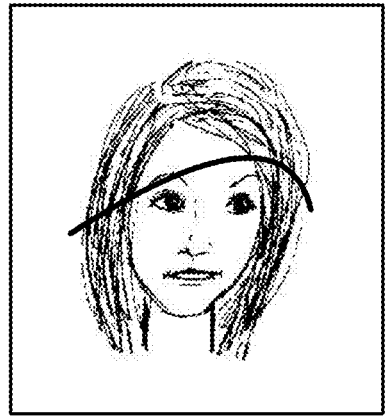
*FIG. 5*

| SESSION# | TOPIC | USER FOCUS | REAL TIME RECOGNITION AVAILABLE? | MODEL USED | % CONFIDENCE |
|---|---|---|---|---|---|
| 2287 | CONTESTS | VISUAL | YES | N/A | N/A |
| 2287 (45 SEC) | IDIOMS | AUDITORY | NO | 678AD5 | 67% |
| 2287 (103 SEC) | LANGUAGES | AUDITORY CONSTRUCTED | NO | 678AD5 | 83% |
| 6432 | PARADIGMS | VISUAL CONSTRUCTION | YES | N/A | N/A |
| 6432 (89 SEC) | MUSIC | KINESTHETIC REMEMBERED | YES | N/A | N/A |

*FIG. 6*

| SESSION# | CURRENT USER FOCUS | CONTENT BLINDNESS? | MODEL USED | RECOMMENDED USER FOCUS | MOVEMENT RECOMMENDATION |
|---|---|---|---|---|---|
| 2287 | VISUAL | YES | 668SD97 | AUDITORY DIGITAL (INTERNAL SELF TALK) | CARTESIAN (2,-3,6) |
| 2287 (45 SEC) | AUDITORY | YES | 678AD5 | VISUAL REMEMBERED | CARTESIAN (-5,-3,9) |
| 2287 (103 SEC) | AUDITORY CONSTRUCTED | YES | 678AD5 | AUDITORY DIGITAL (INTERNAL SELF TALK) | CARTESIAN (2,-3,6) |
| 6432 | VISUAL CONSTRUCTION | NO | 668SD97 | N/A | N/A |
| 6432 (89 SEC) | KINESTHETIC REMEMBERED | YES | 668SD97 | AUDITORY CONSTRUCTED | CARTESIAN (9,-24,8) |

*FIG. 7*

MODIFYING USER INTERFACE LAYOUT BASED ON USER FOCUS

BACKGROUND OF THE INVENTION

This disclosure relates generally to graphical user interfaces. More particularly, it relates to dynamically modifying a graphical user interface in response to a detected user focus.

Much effort and time are expended on the design of graphical user interfaces. The user interface allows a user to interact with an application in an effective and efficient manner. Yet because the available display space is limited, interface designers prioritize more important elements of the interface to more prominent places in the interface such as the top or central portion of the user interface. Less more important aspects of the interface can be relegated to less prominent space or even to additional pages (not the front page) in the interface or to other constructs such as pop-ups or menus.

One important user interface element in web pages is an advertisement. In many industries, the revenue acquired from advertisements is of paramount importance to the company hosting a web application. Various strategies are known to the art to attract user attention to advertisements including ad placement. Ad placement occurs either spatially within the interface or temporally, e.g., by requiring the device to play at least some of a video advertisement before being allowed to progress to selected content. Midroll advertising refers to a video ad that plays in the middle of content, rather than an ad running before or after the publisher's video content. The advertising revenue generated by the Internet has fueled the technology industry's growth.

However, as users become inured to the presentation of advertisement, either in particular or in general, the ads become 'invisible' to users over time as they develop personal strategies to ignore the advertisement. As this is undesirable from the standpoint of Internet advertising companies, there as been effort to improve the presentation of advertisements within a web interface.

Further improvements in graphical interfaces are needed.

BRIEF SUMMARY

According to this disclosure, a method, apparatus and computer program product for modifying a user interface in a web browsing session. During a learning session with a first user, a user model is created. The user model includes associating user movement of the first user with a set of user focus types. During the web browsing session with the first user, the system determines that a first user focus of the set of user focus types in the user model is appropriate to modify a web application user interface to present a priority user interface element in the user interface. The web application user interface is modified according to the first user focus.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 5 illustrates eye and face motion being captured according to an embodiment of the invention;

FIG. 6 is a table representing the content types and user focus types associated during two learning sessions according to an embodiment of the invention;

FIG. 7 is a table representing movement proposed for the content types and user focus types illustrated in FIG. 6 according to an embodiment of the invention;

DETAILED DESCRIPTION OF AN ILLUSTRATIVE EMBODIMENT

Figure 1:
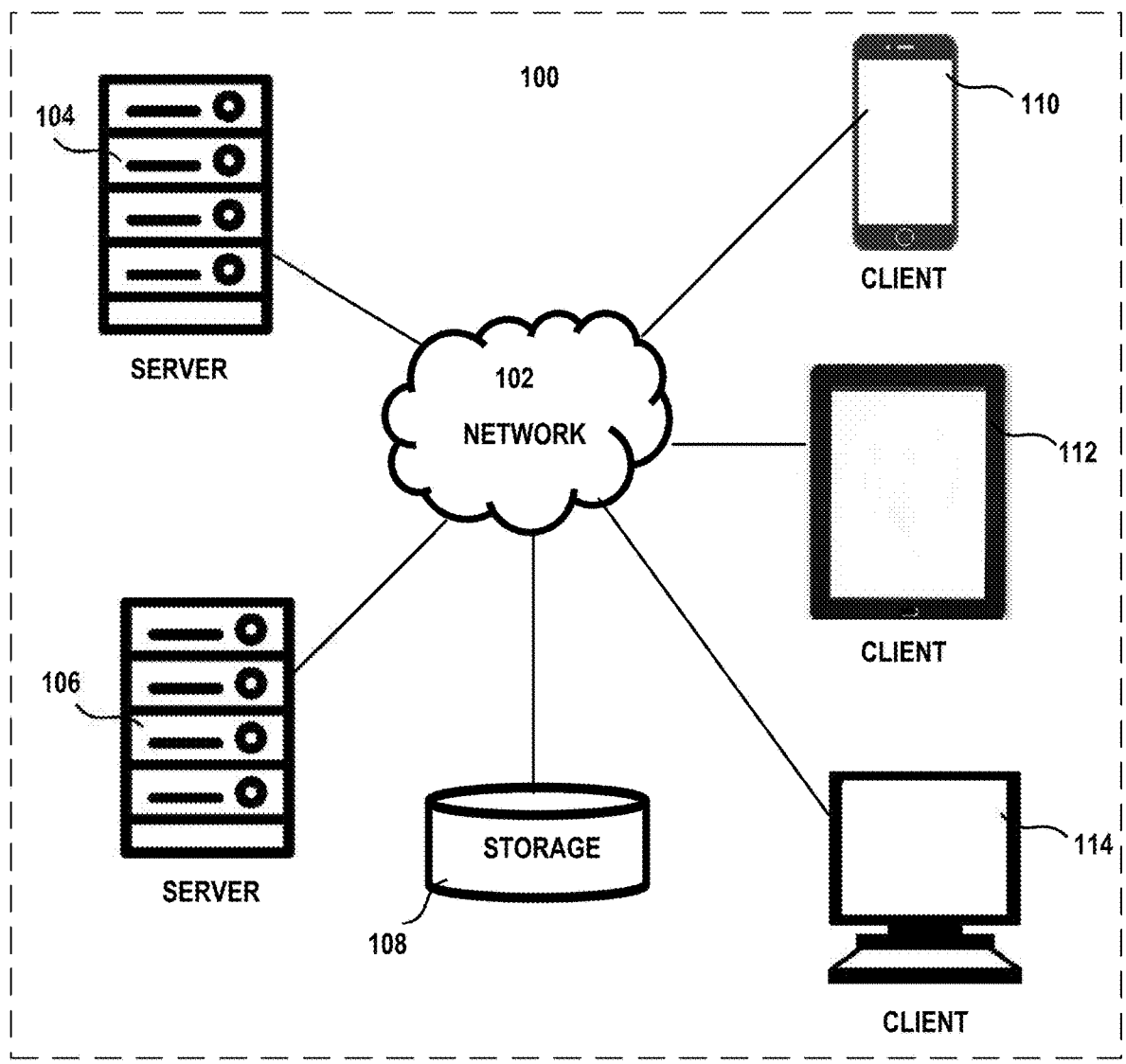
FIG. 1 depicts an exemplary interface for an embodiment of the present invention in which a single individual of interest is shown against an orienting background.

At a high level, the invention provides a method, system and computer program product for modifying a user interface layout based on "user focus". "User focus" is a classification based on observations of repeated user movements and behaviors, e.g. during a learning session when participating in a set of activities. Thus, embodiments of the invention include determining a current user focus based user movement and behavior and use the determined user focus to modify the user interface. Other embodiments of the invention determine that the user focus for a user is predominantly or typically a particular type of user focus in the learning session. In embodiments of the invention, the user interface is modified either because of a current user focus or a predominant user focus so that an important user interface element such as an advertisement is presented in an "important" portion of the user interface. For example, where user focus is determined to be of a given type, a particular location in the interface is predicted to be best for user engagement to the priority element according to the user focus. Responsive to determining the "user focus", the important user interface element is presented proximate to the region of the user interface. In other embodiments where a typical user focus is learned for a particular user or user group, the learned, typical user focus is used to modify elements of the user interface are modified from a standard use interface to a modified initial interface. In yet other embodiments of the invention, user interface elements are presented according to a desired user focus when user engagement in a current user focus is inadequate. In embodiments of the invention, the user interface is presented in a browser which presents a web interface.

The term "user focus" is used to describe location and temporal based positioning of a priority type of information that is predicted to cause a user to be engaged in the information. The user focus is a current user focus or a typical user focus in embodiments of the invention. In some embodiments, the set of user focus types can be likened to types of learning styles such as visual, auditory, reading, and kinesthetic. In other embodiments, the user model is individually based on the individual user behavior and movement. In preferred embodiments of the invention, the "user focus" is associated with a user mental process, attention, orientation or mood. Multiple user foci are associated with a user and stored in a user model. For example, when performing a first activity with a first content type a first user may typically perform best in a first user focus, while performing a second activity with a second content type the first user may typically perform best in a second user focus.

This disclosure is targeted towards increasing user engagement through optimal content placement in a spatial and/or temporal fashion based on the studied content and its susceptibility towards the user focus of the studied viewer. Embodiments of the invention are geared towards changing user focus from the current user focus to a desired user focus to stop content blindness.

Dynamic content placement is used for at least a priority user element in the user interface. The placement is based on monitoring a changing user context, e.g., changing content types with which the user is interacting, in correlation with the user's activity on the display device to improve user's engagement level. The changes in placement are responsive to a configurable time period. Embodiments of the invention use a web browser to present web content such as documents and priority user interface elements such as advertisements. Content is rendered in a manner that is predicted to be conducive to the end user readily processing the content (overcoming content blindness) in a social network. Embodiments use a continuous feedback control mechanism to alter the content and optimize the user interface over time based on changing user focus. The user context can also include device information so that the dynamic content placement is device dependent placement.

This invention also has the advantage in an embodiment of helping to route content to the most apt users, e.g., if through the analysis of facial behavior, User 2 is always closely associated with kinesthetic user focus, then naturally, haptic content might best be routed.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

Figure 2:
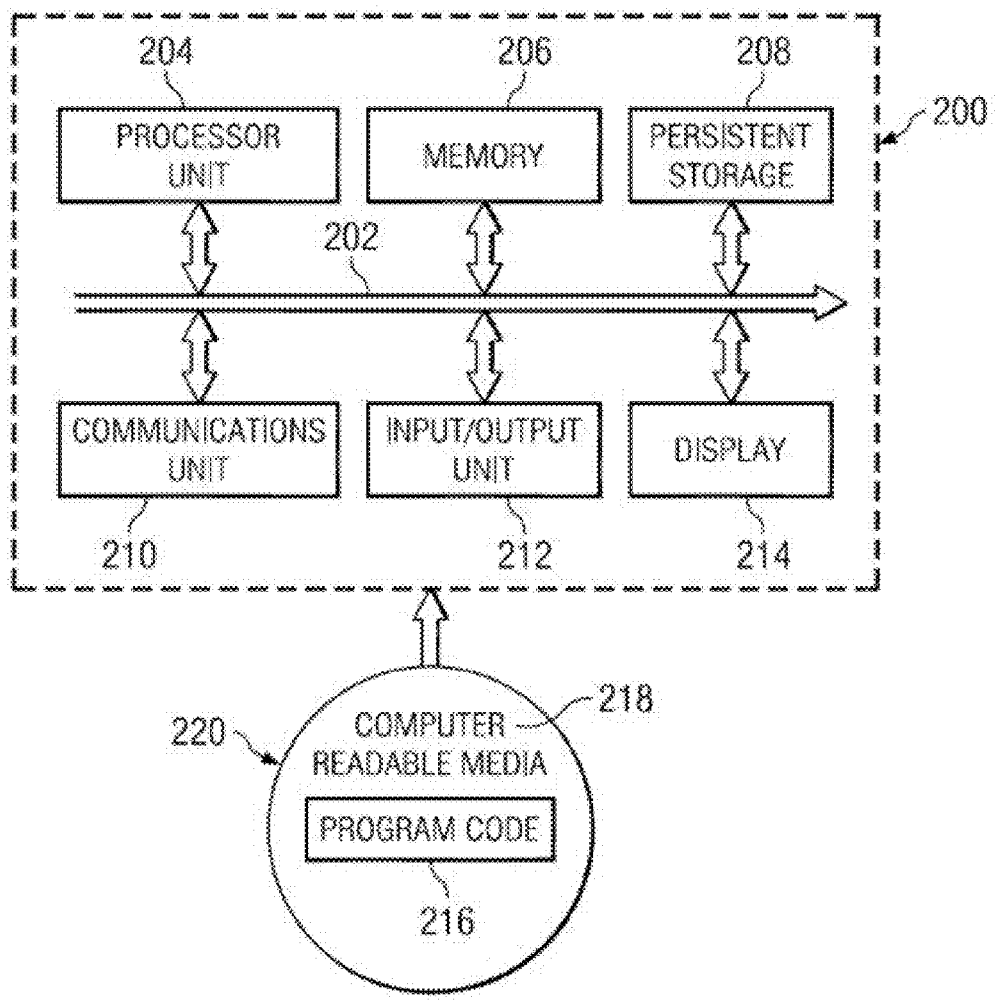
FIG. 2 shows an exemplary interface for an embodiment of the present invention in which two individuals of interest are shown against an orienting background.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 12 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

Embodiments of the invention described by this disclosure increase user engagement through optimal content placement in a spatial and temporal fashion based on the currently displayed content, a model of the user focus of the current user and a predicted effect of changes of the interface on the user focus the studied/modeled viewer. By "temporal aspect", this description means that embodiments of the invention account for the user's changing interests. For example, a time series analysis is performed in some embodiments to account for the user's changing interests and uses those changing interests for UI content placement by changes to the user model. Thus, the interface changes with time/age. In embodiments of the invention, the system and method are intended to change the user focus, i.e. user focus from a currently detected user focus to other user focus state. In particular, one application of the invention is to prevent content blindness for a presently displayed portion of the user interface, e.g., an advertisement.

Figure 3:
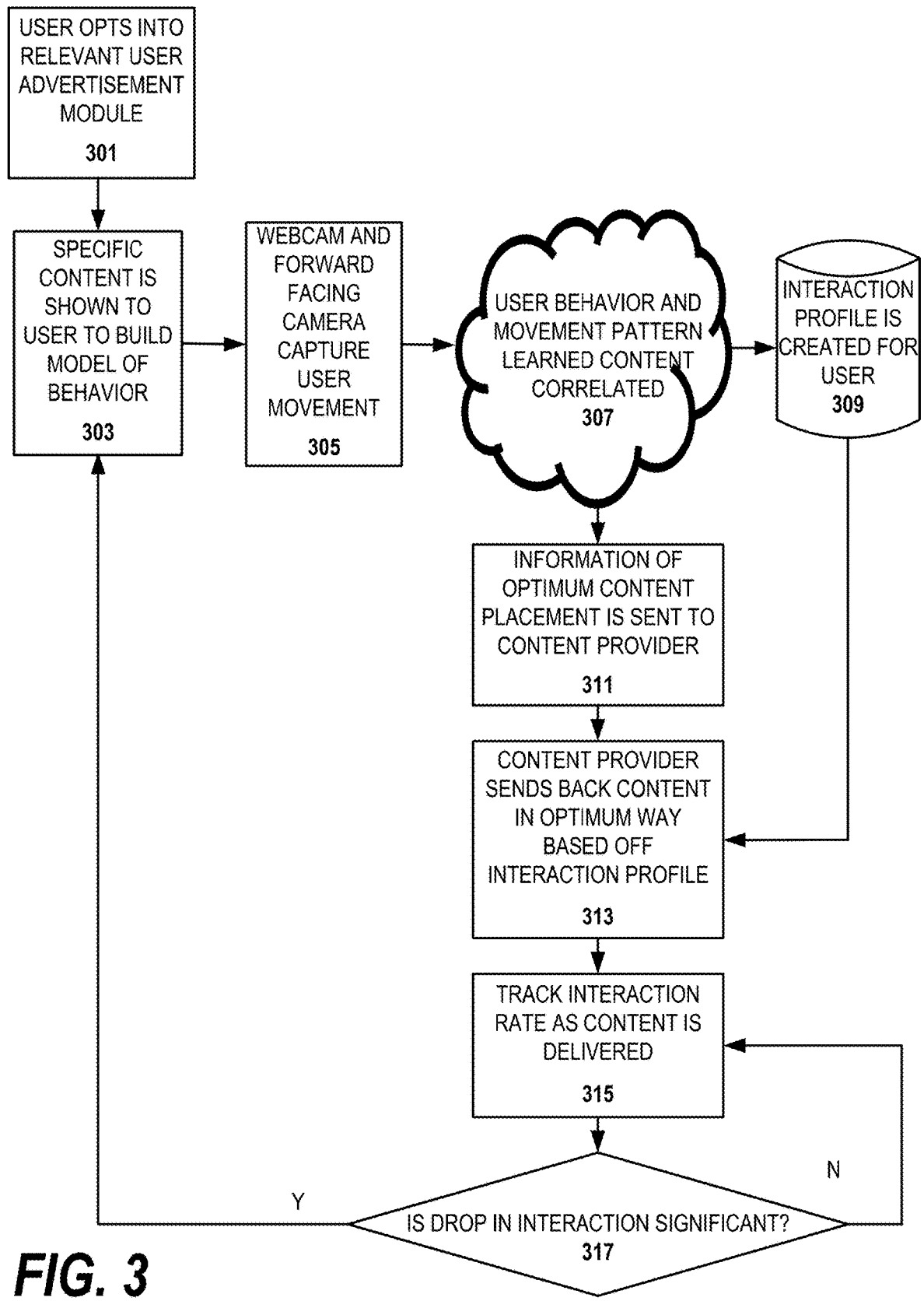
FIG. 3 depicts an exemplary flow diagram for an embodiment of the present invention in which a user model is constructed, and the user model is used to monitor user interaction.

FIG. 3 depicts an exemplary flow diagram for an embodiment of the present invention in which a user model is constructed, and the user model is used to monitor user interaction. In preferred embodiments, a user model will contain information concerning user behavior and user movement. User behavior are interactions with the application in which the web content is being presented. User movement includes eye, facial and body movement which is indicative of the user focus.

In step 301, the user opts into or allows specific content delivery based on user input feedback to the device. For example, advertising content is provided via a social media platform in some embodiments. A user prompt is shown asking the user to agree to a training session in some embodiments. If the user agrees to opt-in, in step 303, specific content is shown in at least one specific content type is shown to the user. In step 305, user information such as eye, facial and physical movement is captured from a camera incorporated in the device. User feedback to the application and the advertising content via the device interface is provided to the web service providing the content and used as "user behavior" for establishing a user focus. Other user interactions and behaviors can be captured by the device input devices and are forwarded to the web service.

In embodiments of the invention, the web service which builds the user model is a different web service than the content provider providing the web content. The web service receives requests from subscribing web content providers to receive relevant user models. In other embodiments, the web service providing the content builds the user model. In step 307, the web service analyzes user movement and behavior in response to the specific content and correlates the captured movement and behavior with the content. For example, the system leverages eye tracking software to determine user eye focus on respective parts of the web content. When a slideshow of images is shown to user, the user eye tracking determines that the user typically reads the caption of a new slide first and then views the image. User input, e.g., type and timing, to the interface is categorized and forwarded to the web service for possible incorporation in the user model if patterns are found.

Machine learning is used to build the user model (also called interaction profile in this description) in some embodiments. The user movement/interactions with the content as well as the associated content type is processed by the machine learning engine. In embodiments, portions of the user interaction profile include an optimum delivery location for priority content for the user for the content type based on the user pattern of movement and behavior, step 309. However, in other embodiments, the machine learning engine is trained on user content in general, i.e. not specific to a content type, to build a generalized user model containing user movement and interaction patterns of the user.

As an example, the machine learning has determined (through eye tracking) that user reads the caption then views the image, then usually spends half a second looking at the space next to the slideshow and page border. This space between the slideshow and page border is identified as an optimum location to present priority content, e.g., an advertisement, in the content type—slideshows. The optimum location to present content for slideshows is then added to the user model. One feature of the invention is to inform content providers of at least one optimal way to present content to a user based on the content type. A plurality of different locations is included in user profiles in some embodiments to give the content provider flexibility. The content type is defined as a content format, e.g., a slideshow in some embodiments. The content type is also defined as content subject matter, e.g., video games, or content provider in other embodiments.

In step 311, the interaction profile/user model is sent to a content provider. In embodiments, the content provider is one which originally requested the web service to create the user model/interaction profile. In other embodiments, the content provider is a subscriber of user models for the particular user or users of the content provider's web site. The content provider uses the user model to present content in the best way for the particular user depending on content provided type, step 313. In yet other embodiments, a refinement of user models can be based on the content provider. That is, given that a content provider may present content in a specific manner, the particular user may react to the content provider's content in a different manner than the content from other content providers, so the content provider becomes part of the definition of content type. Separate user models can be prepared based on particular user, content type, content subject matter and content provider in embodiments of the invention.

In embodiments of the invention, once the initial user model is created, as further content is delivered, the machine learning module uses additional interactions for each user, content type, content provider and so forth to further refine the user model(s). In some embodiments, this is a continuous process—user behavior and movement continue to be captured and fed to the machine learning. Improved models are provided to content provider or subscriber content providers. Alternatively, embodiments track the user interaction with priority content, e.g., advertising, based on the prior user model, step 315. If the user interaction does not reach or drops below a threshold level, step 317, a new training session, step 303, or captured user behavior and movement is forwarded to the machine learning to provide a new user model(s). In embodiments of the invention, the new user model may be content provider specific, that is, if only one content provider is experiencing a lack of user engagement, only that content provider is sent the improved user model.

As an example embodiment, the particular user, "user 2", is determined via client side request or server side response of page and correlated to the particular user identity. The content type is determined with the associated with metadata tags, HTML class parsing, or machine processing of the content type. A content provider determines that user 2 is viewing slideshow content via the HTML class tags associated with the content. User 2 habitually views a space near the right border of the page after she is done reading the content in the slideshow. As determined by machine learning, the best place for a link to be placed is just left of the right border of the page according to the user eye tracking for the particular content provider content. This information is stored in a user model for User 2 for slideshow type content.

Embodiments of the invention dynamically place content of priority interface elements within a graphical user interface (GUI). The GUI is comprised of a plurality of different user interface elements. For example, embodiments dynamically place an advertisement element in a web browser display of documents, images and videos. Some embodiments use device dependent placement to place an element within the user interface which the web browser (or other program) has determined should be a user priority. That is, in embodiments of the invention, different user models are used to display content for different devices.

In preferred embodiments, one of more user foci or "user focus" types are included in the user model. Examples of user focus types are described below. As is mentioned in this description, in some embodiments, the user foci are intended to indicate how the user is processing the information or a current state of mind of the user. In other embodiments, the user focus is simply a collection of user behavior and movement that a learning session has determined to be a reliable indicator for placement of content for optimal user engagement for a given situation, the situation being categorized by content type and content provider, for example. The current user focus is determined by constantly or periodically monitoring the user context, e.g., the user eye, facial and body movements and positions in correlation with user activity with device. If the determined user focus indicates that the user's attention is likely not on priority elements of the user interface, the interface on the display device is changed to improve user's engagement level by displaying content according to the detected current user focus. As is explained below, in some embodiments, when displaying content according to the determined current user focus does not create the desired level of user engagement, the user interface changes the display position of user interface elements to change the user focus.

Embodiments of the invention render content in a manner that is conducive to the user processing the content (overcoming content blindness) in a specific application, e.g., a social network. The placement and changes in placement of priority elements of the user interface are dependent on the placement of non-priority elements of the interface of the specific application.

Embodiments of the invention use continuous feedback control mechanism to alter the placement of the user interface content and optimize the placement over time based on the changing detected user focus. In these embodiments, a first user focus may indicate a different placement of user interface elements than a second user focus would indicate. That is, the particular user focus detected will indicate the placement of user interface elements which can be different than another detected user focus. In embodiments of the invention, the user or administrator configures the web content server so that a detected user focus must be present over a configurable time period before interface changes are made to avoid a constantly changing user interface.

This invention also has the advantage in certain embodiments of helping to route content to the most likely attentive users. For example, if through the analysis of facial behavior, User 3 is always closely associated with a visual user focus, then multimedia content might be routed to User 3 has compared to other types of content preferentially routed to other users.

Figure 4:
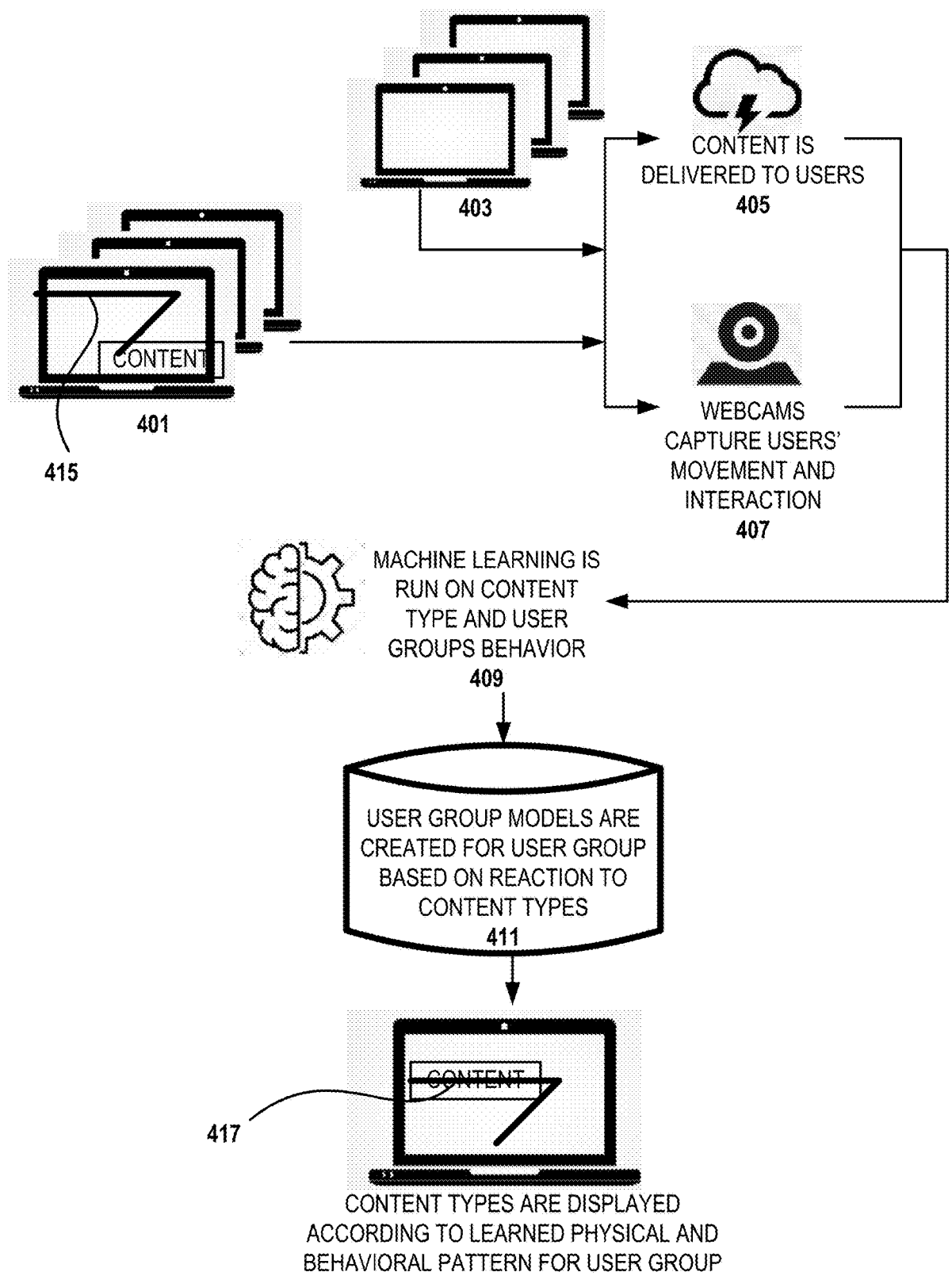
FIG. 4 is a second flow diagram for an embodiment of the present invention in which a user model is constructed for a user group, and the user model is used to display content and monitor user interaction with the interface.

FIG. 4 is a second flow diagram for an embodiment of the present invention in which a user model is constructed for a user group and the user model is used to present and interface and monitor user interaction for a plurality of users. This embodiment differs from the first embodiment in that user models are created for user groups 401, 403 rather than for individual users. In some embodiments where users are assigned to user groups, a hierarchical clustering model is used to cluster users based on user movement, behaviors, interests or characteristics, e.g., the cluster can be based on common interests (e.g., visit the same content providers), common age groups, common user focus types, how the respective users interact with user interfaces or user GUI preferences such as mouse speed and using dark mode. A combination of these factors can be used to cluster users. The initial user group assignment can change if a respective user no longer belongs to the user group based on changing interests or preferences. Users are classified as group members or as belonging to a certain user type whose behavior and movements are described in the user group model. Also in this embodiment, new users are continually added to the user groups and their training for new content or new content types can allow the user group model to expand for new content types without having existing users provide their behavior and movement for the new content. The web server can test existing content types that are served by the existing set of content providers that subscribe to its service as well as new content types that the subscribing content services plan to offer in the future.

The process continues as the content is delivered to individual users, step 405, in the user groups and the web cam captures the users' movements and interaction with the presented content.

In step 409, machine learning is used to correlate the users' movements and behavior in the user group models which are stored in the web service, step 411, and distributed to the subscribing content providers. The web content providers use the appropriate user group model for a user belonging to the user type associated with the user group model and for the content being displayed. The screen 415 of the first device of user group 401 and the screen 417 of the device in step 413 are intended to represent the change in content positioning according to an embodiment of the invention. In screen 415, the black line representing the user eye track has a terminus near the left of the screen away from the placement of the priority content. In screen 417, the content placement has been adjusted according to the user group model near the user eye track terminus.

Embodiments of the invention are directed to optimizing "mid-roll advertising". Mid-roll advertising refers to a video ad that plays in the middle of content, rather than an ad running before or after the publisher's video content. In theory, mid-roll ads should have a higher conversion rate than ads at the beginning or end of the video. However, "ad blindness", where a user tends to "automatically ignore" those advertisements either consciously and/or subconsciously, is a problem for Internet advertising companies. Internet advertising revenue in the United States has surpassed those of cable television and broadcast television. Using a user model, the mid-roll advertising can be optimally placed either spatially or temporally.

Embodiments of the invention rely on the fact that a user focus or a change in the user focus is often accompanied with a physical movement, e.g., a movement of the eyes, head or body. These movements can be unique to different users, e.g., user B looks up 30 degrees to visualize something or user C looks sideways 42 degrees when contemplating a difficult problem. By learning the characteristic movements of each user, embodiments of the invention, a user model can be created. In some embodiments, where users share characteristic movements or behaviors, the users can be classified in a user group and use the same user model.

A variety of user focus classification schemes are used in different embodiments of the invention. The user focus classification scheme is one basis for formation of a user group; users who habitually engage in or prefer a certain type of user focus are classified in the same user group. One classification scheme which can be used utilizes eye movement patterns is identified by Dilts, Grinder, Bandler and DeLozier in a set of papers published in the 1976 to 1980 time frame. Each of the eye movements is associated by Dilts et al. with a user focus type. These eye movement patterns and user focus types include:

1. Eyes Up and Left: Non-dominant hemisphere visualization—i.e., remembered imagery (Vr).
2. Eyes Up and Right: Dominant hemisphere visualization—i.e., constructed imagery and visual fantasy (Vc).
3. Eyes Lateral Left: Non-dominant hemisphere auditory processing—i.e., remembered sounds, words, and "tape loops" (Ar) and tonal discrimination.
4. Eyes Lateral Right: Dominant hemisphere auditory processing—i.e., constructed sounds and words (Ac).
5. Eyes Down and Left: Internal dialogue, or inner self-talk (Ad).
6. Eyes Down and Right: Feelings, both tactile and visceral (K).
7. Eyes Straight Ahead but Defocused or Dilated: Quick access of almost any sensory information; but usually visual.

These eye movement patterns are supplemented with facial movements, facial expressions and body movements in embodiments of the invention.

If one of these user focus types is determined based on user behavior or movement, the information is stored in the user model. When the user model is used by the content provider, the priority user interface element is moved appropriately. For example, in embodiments of the invention where priority content is placed according to a current user focus, if the "dominant hemisphere visualization" user focus was detected, an advertisement is moved from its current position to a position that is up and right from the current position. In other embodiments of the invention, where the user model of a user or user group indicates the user normally processes a certain type of web content in the "non-dominant hemisphere visualization" user focus state, the advertising content is initially presented and placed according to a rule for maximum user engagement. The rule can be developed through testing indicating what type of advertising is most effective for the user type.

One skilled in the art will appreciate that the Dilts et al. user focus types are merely exemplary and other classification schemes are used with other embodiments. Similarly, though the Dilts et al. scheme classifies a user as having a user focus type primarily by eye movement, other embodiments use other types of user movement such as facial and body movement to classify a current or typical user focus. User behavior, e.g., typical user input with a given content type, can also be used to classify the user or the user focus. Also, although a classification scheme may be used to classify the types of user focus, a particular user may have different characteristic movements and behaviors than the norm; these characteristic movements and behaviors would be stored in the user model for the particular user.

Moving elements in the user interface is well-known. In embodiments where the web content provider is in control of publishing the web content, typical formatting techniques using windows handles, markup language and style sheets can be used. In other embodiments of the invention, user interface elements can be moved at the client device by a browser plug-in or other app. In such embodiments, first, screen capture is done, then elements or objects on the screen are identified using a multi-image classification model such as the Yolov4 Model and those entities or graphical objects are identified as contours covering the dimensions on the canvas. Then, at the client device, a high priority user element is identified and moved to an appropriate position based on the detected user focus.

For an example of classifying a user based on user behavior and changing the user interface accordingly, consider a user that according to the machine learning tends to skip reading "long" paragraphs, e.g., "long" being measured by a user defined or learned threshold, long paragraphs can be converted into segregated pointers. The user model would contain information to avoid presenting long paragraphs to the user. Embodiments of the invention can test whether the conversion of the content from long paragraphs to bullets/pointers is effective. For example, by correlating user gaze detection and content variations, e.g., displaying content as either the long paragraphs or bullets, the machine learning can determine whether user is spending time in reading the important content. As another example, when the user does not have the patience for long videos, i.e. based on the machine learning, the video may be divided into different segments and arrayed in a matrix accompanied by a summary of the video of the segment as a caption or otherwise proximate to a thumbnail representing the segment. Tests can be performed whether the conversion is effective. Tests are performed to determine an optimum placement of important content, i.e. advertising, in the revised format.

In embodiments of the invention, an opt-in system will prompt the user to agree to create a user model and have content presented to the user according to the user model. Known mechanisms are used for creating the user information in a user model. Eye tracking and facial recognition software will track eye movements, face movements and facial behaviors as users interact with different content and scenarios presented in a user interface. Body tracking software is used to measure and summarize body movement and associate that with the detected user focus. Natural language interfaces such as speech recognition or speech generation can be used to interact with the user during the learning process.

FIG. 5 illustrates eye and face motion being captured according to an embodiment of the invention. The black lines represent eye tracking or facial movement tracking as the users are asked questions during the learning process. That the users have different characteristic movements in response to the same question is represented by the different shapes of the black lines in front of respective user faces.

During the learning process, a series of activities are presented to the user(s). The user(s) responses are collected and used to create the respective user model. In preferred embodiments, the activities are designed to respectively test for different types of user focus or learning. As the user interacts with the device, the facial recognition software collects information on the eye, facial and body movement of the user during a particular activity. Consistency of eye and facial movement for different instances of the activity can indicate an affinity or aversion for the activity. The system may present activities of the same type to the user so that a confidence level can be reached that the eye, facial and body movements are consistent, and therefore, indicate the type of user focus that is occurring for the particular user.

In an example set of learning activities, the user encounters the following scenarios:

1. "Visual Remembered" Activity: The system will provide the following verbal cues: "What color is your car?", "What kind of pattern is on your bedspread?", "Think of the last time you saw someone running.", "Who were the first five people you saw this morning?"
2. "Visual Construction" Activity: The system will provide the following verbal cues: "Imagine an outline of yourself as you might look from six feet above us and see it turning into a city skyline.", "Can you imagine the top half of a toy dog on the bottom half of a green hippopotamus?"
3. "Auditory Remembered" Activity: The system will provide the following verbal cues: "Can you think of one of your favorite songs?", "Think of the sound of clapping.", "How does your car's engine sound?"
4. "Auditory Constructed" Activity: The system will provide the following verbal cues: "Imagine the sound of a train's whistle changing into the sound of pages turning.", "Can you hear the sound of a saxophone and the sound of your mother's voice at the same time?"
5. "Auditory Digital (Internal Self Talk)" Activity: The system will provide the following verbal cues: "Take a moment and listen to the sound of your own inner voice.", "How do you know it is your voice?", "In what types of situations do you talk to yourself the most?", "Think of the kinds of things that you say to yourself most often."
6. "Kinesthetic Remembered (Tactile)" Activity: The system will provide the following verbal cues: "When was the last time you felt really wet?", "Imagine the feelings of snow in your hands.", "What does a pinecone feel like?", "When was the last time you touched a hot cooking utensil?"
7. "Kinesthetic Remembered Visceral/Emotional" Activity: The system will provide the following verbal cues: "Can you think of a time you felt satisfied about something you completed?", "Think of what it feels like to be exhausted.", "When was the last time you felt impatient?"
8. "Kinesthetic Construction (Tactile)" Activity: The system will provide the following verbal cues: "Imagine the feelings of stickiness turning into the feelings of sand shifting between your fingers.", "Imagine the feelings of dog's fur turning into the feelings of soft butter."
9. "Kinesthetic Construction (Visceral/Emotional)" Activity: The system will provide the following verbal cues: "Imagine the feelings of frustration turning into the feeling of being really motivated to do something.", "Imagine the feeling of being bored turning into feeling silly about feeling bored."

The cues can be delivered in a variety of manners, e.g., as speech, text or a multimedia presentation to determine the user's reactions to different modes of communication. Similarly, the system may allow the user to respond the to verbal cues in different ways, e.g., verbally or by input to the user interface. While the example above consists of purely verbal cues, other activities, tests and challenges can be used in other embodiments of the learning activities.

A tracking engine and analysis module compares the eye, facial and body movement characteristics between activities and different instances of the same type of activity. If consistency in eye, facial and body movement is found for a given type of activity, and therefore, the type of user focus associated with the activity, in some embodiments and their configurations, the system may automatically associate the user focus type with the detected eye, facial and body movement. In some embodiments, the confidence level threshold between eye, facial and body movement characteristics and user focus types are a preconfigured threshold. For example, if a 95% match or confidence level is ascertained (based on visual matching criteria), then the system assigns the user focus type associated with the current activity. In other embodiments, the threshold is user configurable or the user is prompted to confirm that the system should make the association. Note that embodiments of the invention may use only certain types of user movement when building a user model.

In embodiments of the invention, either an admin user or the end user may modify, change, or add the user focus types for a specific end user.

Embodiments of the invention are rule based. That is, the user model contains rules for the user element placement. Rules may be manually created, or the rules may have been derived by the system from the history of observations and correlations from the learning process for the particular user. In embodiments, if the correlations between user focus types and the detected eye and face movement are ambiguous, the system may associate the user behavior and movement with the user focus type based on user feedback, i.e. a single user or a number of votes of a plurality of users of the same type for the activity. For example, the user interaction can be counted as a "vote" for the activity. One method of compiling "voting" is by the "Famous AB testing" where the selections made and/or time spent on the GUI element or article indicates a "vote" for the element or the activity. Alternatively, there may be a prompt requesting the user to confirm that the element or activity is significant to the user or to confirm a proposed rule.

In an embodiment of the invention, an aggregation across a wide sample content is implemented. For example, in the embodiment, a set of videos are imported and analyzed for identification and categorization. Analyzing the video by different criteria is well-known; many approaches known in the art are suitable for use by embodiments of the invention. The categorized videos are used as part of a training session.

In embodiments of the invention, a user is able to set-up an opt-in user profile for an application, e.g., in their social network system. As an example, the user profile may have the following configurable parameters:

1. Scope: e.g., which user focus types are to be included in the user profile, user model and can be associated with a set of user behaviors and/or eye and facial movements. What content types will be used to create the user model(s).

2. Testing scenarios, user behaviors and user eye and facial movements used in learning: the user can set limits on number or type of scenarios to be included in the learning. That is, in embodiments only certain selected scenarios or scenarios using specific types of content, will be used in the learning process to correlate user behaviors and user movements with a set of user focus types. Similarly, the user can also list which user behaviors and/or eye and face movements can be associated with user focus types.

3. Triggers and Actions: When new interactions appear in a social network application or in a file system, the user can specify whether new interactions or certain types of interaction will cause the system to enter into a new learning session.

The user profile parameters are used to create the user model(s) in embodiments of the invention.

Embodiments of the invention allow the user to establish user models for different ones of their devices. As each device is equipped with a different set of sensors, the devices will vary in their capabilities in which user behaviors and movements can be monitored. Further, because the ergonomics of the device differ because of the form factors and associated input devices, the user behaviors and movements will likely differ from device to device.

Embodiments of the invention use different observed user behaviors and movements to include in the user model and/or to create a user group. Among the factors which are included in embodiments of the invention are (but are not limited to):

Eye, hand, face, body movement from prior eye, hand, face, body position, e.g., after new user interface element (i.e. advertisement element) is displayed Proximate activity—Two users who like the same color of a car have more proximate activity than people with dissimilar interests—that indicates proximal distance between the two users.

Current facial expression (e.g., smile, frown, etc.)
Current hand and body position
Direction the user is looking
Repeated user selection or other interaction with user interface elements, particularly those elements designated as "important" by the web service or content provider
Preferred presentation of web content by user Although embodiments of the invention use a single learning session to build the user model for a given device, other embodiments use interactions after the initial learning session to further refine the user model. That is, the system over time uses these additional user interactions to modify the user model using eye, facial and body tracking and other monitoring software. In embodiments, the facial tracking and other monitoring software used for the initial learning session and those used during the use of the user model when interacting with "live" user content are the same software.

The scores from multiple interactions in the training session are aggregated for the studied, particular user for a particular interaction type, e.g. a type of web content. In some embodiments, users are classified as a certain user type and the input of the training sessions by users of a particular type can be aggregated into a user group. Thus, in embodiments using a set of user types, where user 1 and user 2 are classified as the same user type, and a sample of many (e.g., over a hundred) interactions are available for user 1 as it relates to a first topic, i.e. content type, but only a few (e.g., less than ten) interactions are available for user 2 for the first topic, the input from user 1 will greatly improve the user group model. Since the user group model is also used by user 2 in predicting the user focus of user 2 for the first topic content.

Another type of threshold used in embodiments of the invention is an "affinity threshold". Affinity thresholds may be set by the system for each of the user focus types. These thresholds can be used to determine which type(s) of user focus the user has the greatest affinity for or most habitually uses. In an embodiment, a score of greater than "0.8" is considered a high affinity. Thus, if the learning process establishes that the user has a score of 0.8 or greater for a specific topic or type of content for the "visual thinking" user focus type, this means that the user is highly predisposed to that thinking process for this topic or type of content.

Note the aggregation may be on a set of interactions from a first user, user 1. But further aggregation may also be implemented by comparing and contrasting the scores from the videos from a second user, user 2.

One component of the user model in some embodiments is "thinking distance". That is, thinking distance is a measure of how the user movements and behaviors may change with time as more interactions are added and removed. An example of "thinking distance" is that over time, the user focus when seeing certain user interfaces and interacting with respective UI elements in those interfaces changes with time. For example, how a user perceives a particular user interface may be initially "good", but as the user has further interactions with the interface the perception may change, the interface is perceived as "dated" or "tacky" at a later time. The user may no longer be engaged with the particular user interface. Thinking distance is varies with time. As another example, thinking distance indicates how much time a user takes to successfully interact with the user interface and its respective elements, e.g., traversing between different portions of the web site or web page. Embodiments which use thinking distance can track the user model and how it has changed with time. Using this history, the web service can predict when a change in the user model is needed to improve user engagement. Also, the history of the user models can be regarded as life cycle of a user and be used to change the user model of another (e.g., a newer) user or when stored user behavior and movement needs to be retrieved for possible modification of the user model based on the history of changes in user models from more experienced users was experienced.

As described herein, after the learning process, the system monitors user behavior and movements to determine the current user focus for the user. By monitoring the user behavior and movements described in the user model, the system can predict the current user focus of the user. In embodiments of the invention, if monitoring information or a specific type of monitoring, e.g., real-time facial monitoring information, needed by the user model is not currently available, the highest affinities in the user model can be used to present the user interface as default user focus types. The detected or default user focus is used to modify the user interface to bring a priority interface element to the user's attention. Also, if the user affinities in the model differ according to the topic, the determination of the current user focus is also based upon the current content topic (if the current topic or topic type is in the model).

FIG. 6 is a table representing the content types and user focus types associated during two learning sessions according to an embodiment of the invention. In the session column, the learning session, i.e. 2287 or 6432, is indicated. Given the difference in session numbers, this may indicate an initial session when the user first signs up with the social network and a subsequent session which was triggered by the content provider offering new content types. Alternatively, it may present aggregated data from two different users for a user group model.

The "topic" represents a content type being included in the user model. In the learning process, different user focus types are associated with different content types. For example, the "contests" content type is most strongly associated with the "visual" user focus type, while "idioms" content type is most strongly associated with the "auditory" user focus type and so forth. The table can contain information on the session(s) where the user movement and behavior were learning, and optionally a time or segment of the session. The "real time recognition available" column indicates whether the system is still learning, tracking and finding the relationship (along with user clustering for the user group models) or has established confidence in a trained model. If the "real time recognition available" column is labelled "NA", it indicates the system is still learning the user behavior and movement.

In some embodiments, where a user model has not yet been learned or not reached a predetermined confidence level for a particular content type, a chatbot is engaged, e.g., a pop up dialog box, to interact with the user. In the chatbot interaction, the user can tell the system how to modify the user interface, e.g. resize or relocate some components. A user written response can be received, "I would have preferred xyz elements on right side of the screen in column format and big sentences in pointers for instance". The user feedback can then be incorporated into the user model. Thus, in some embodiments, the user model can contain both learned user movement and behavior data and user directed data for modifying the user interface. The percent confidence level indicates how strongly a given correlation between a respective content type and a respective user focus type is based on the learning process.

FIG. 7 is a table representing movement proposed for the content types and user focus types illustrated in FIG. 6 according to an embodiment of the invention. When the web content system detects "content blindness" of the user for certain content types, in embodiments of the invention, it selects a different user focus to trigger. This is represented by the table. By triggering a different user focus to trigger, the intent is to "kick-start" renewed interest in the current content type. According to embodiments of the invention, the different user focus is activated by moving the priority content, e.g., a video advertisement in a different location than as currently presented in the interface. The movement is performed according to the appropriate user model.

For example, referring to FIG. 7, according to user model no. 668SD97, if content blindness is encountered for the current content type, the user model indicates that the web content should be moved to the Cartesian coordinates (2, −3, 6) relative to the current position. Similarly, according to user model no. 678AD5, if content blindness is encountered for a different current content type, the user model indicates that the web content should be moved to the Cartesian coordinates (−5, −3, 9) relative to the current position. The fourth row of FIG. 7 illustrates a situation where content blindness is not detected for a particular content type. In this case, the user model does not recommend a new location for the priority user element as user engagement is adequate.

Also represented in the table is that FIG. 7 represents that more learning has occurred since the table in FIG. 6. This is due to more learning sessions, user behavior and movement captured during a "live" session with the user and the web content provider or user directed data. Also represented is the use of different user models for respective changes between user focus types. Although not shown, the table can include columns for content type, web content provider and other parameters in the user model(s).

In some embodiments of the invention, because of past user behavior with similar content, the web content system can predict what future content will be requested, and therefore, displayed. With the requested content, other important user interface elements, e.g., an advertisement will be displayed. The system may have learned that the user has become content blind to advertisement when the requested content is displayed, and preemptively present the advertisement in a manner predicted to engage user interest. Thus, in embodiments of the invention, content blindness is specific to different content types, i.e. either detected or anticipated.

In alternative embodiments, an absolute Cartesian coordinate or other placement parameter is used to describe how the priority interface element should be moved for the user or user group.

The recommended visual changes will have the effect of changing the current user focus for at least a specific content type. Changing the user focus has the result of mitigating the content blindness in a directed method for the specific user and specific content type.

Figure 8:
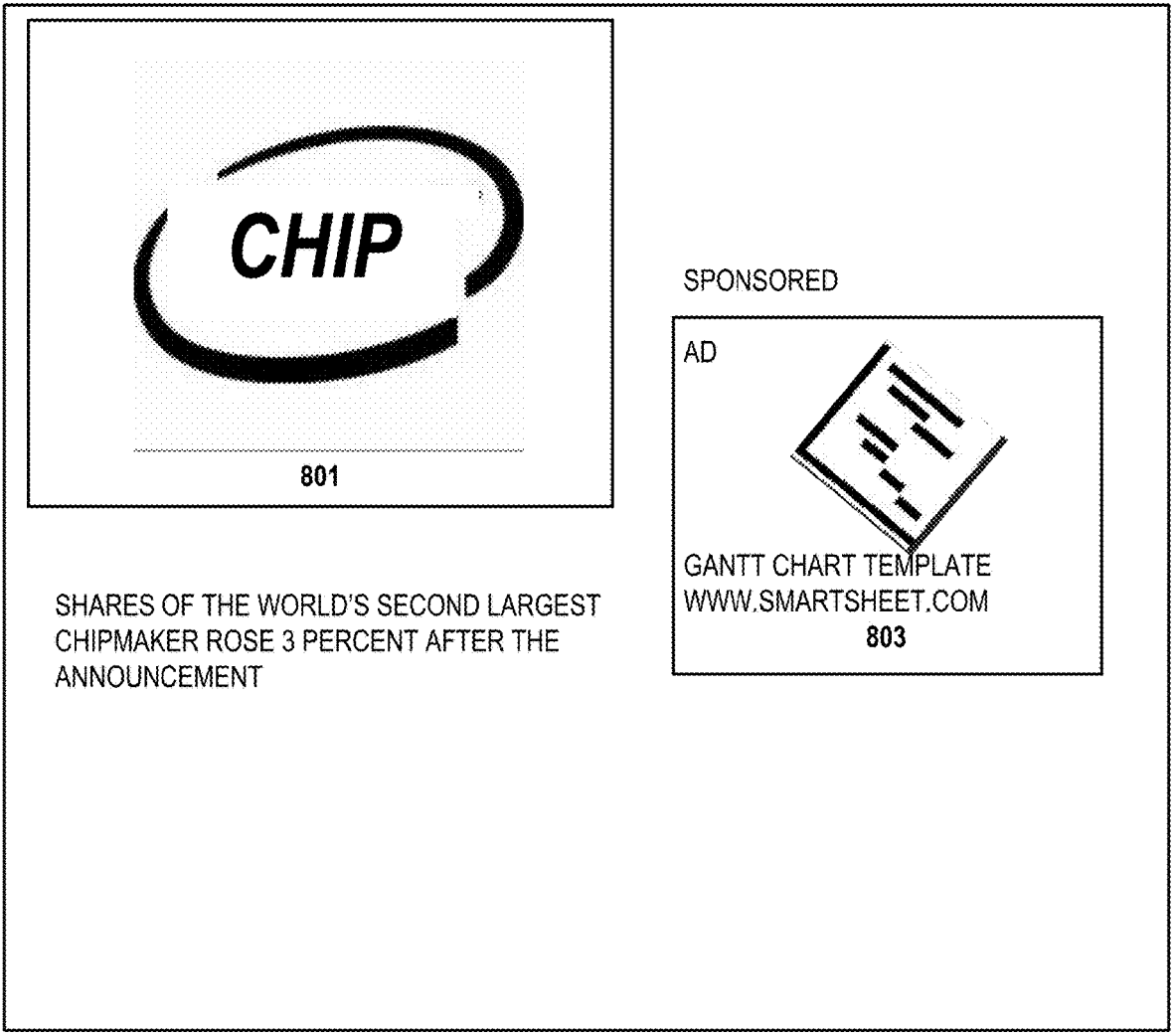
FIG. 8 shows a user interface displayed according to an embodiment of the invention according to a default set of user focus types and the intended content.

FIG. 8 shows a user interface displayed according to an embodiment of the invention according to a default set of user focus types and the intended content. The figure can also illustrate an unmodified graphical user interface, where the web content provider provides the normal web content unless user content blindness or disengagement is detected. In this drawing, the background user interface element 801 and the priority graphical user interface element 803 are presented in default positions, either according to the normal arrangement of web content or because of the default positioning indicated by the default, learned user focus for this content type by the particular user or user group.

Figure 9:
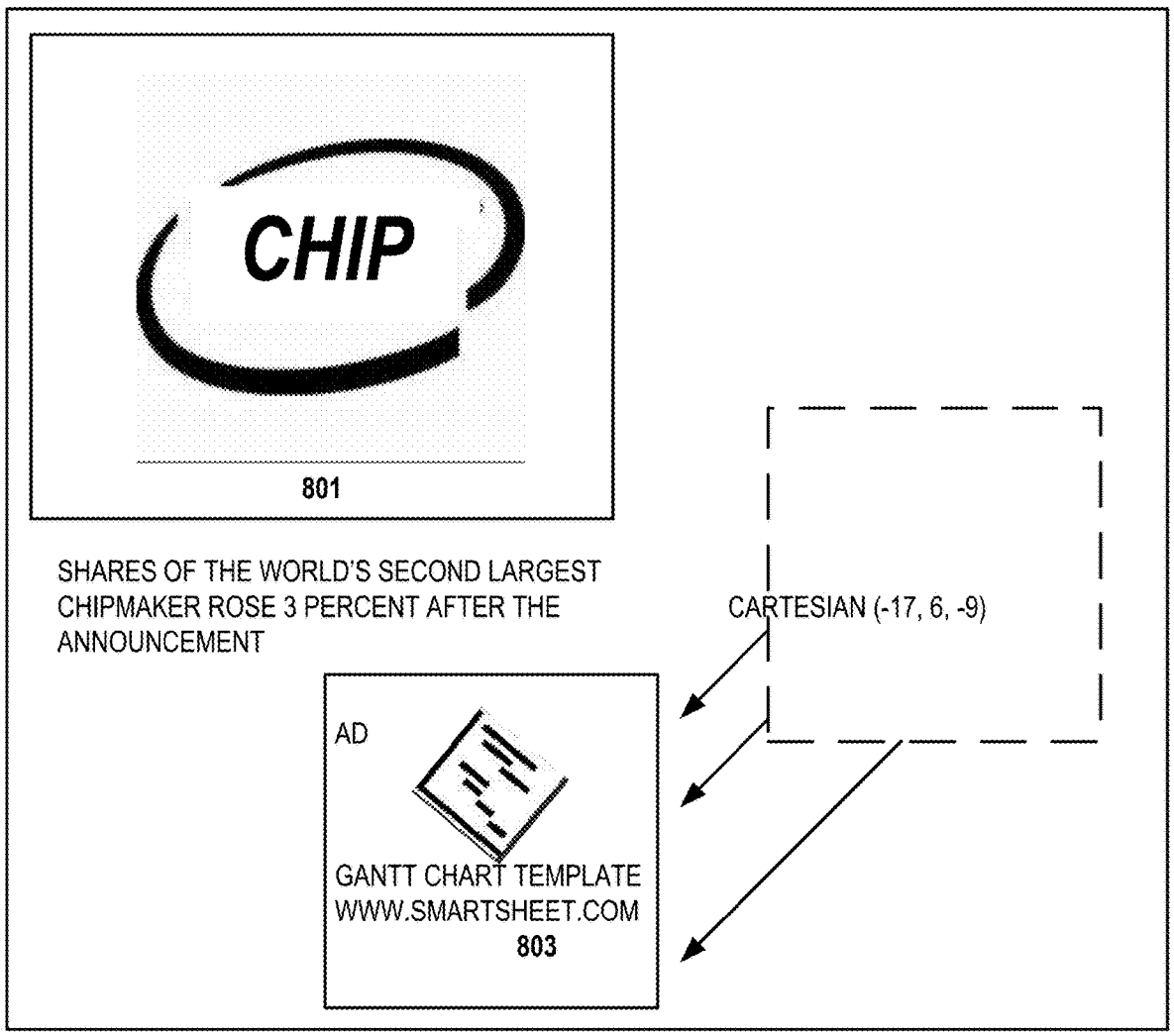
FIG. 9 shows a user interface displayed according to an embodiment of the invention depicting a relocation of content according to the detected user focus and content type according the appropriate user model.

FIG. 9 shows a user interface displayed according to an embodiment of the invention depicting a relocation of content according to the detected user focus and content type according the appropriate user model. The arrows in the drawing illustrate the movement of the priority user interface element 803 according to the appropriate user model. In dashed lines, the drawing illustrates the prior or default location of the priority user interface element 803, e. g., the advertisement, to a new location. The new location, in embodiments of the invention, is based on the content type, the user model and the current user behavior and movements.

Figure 10:
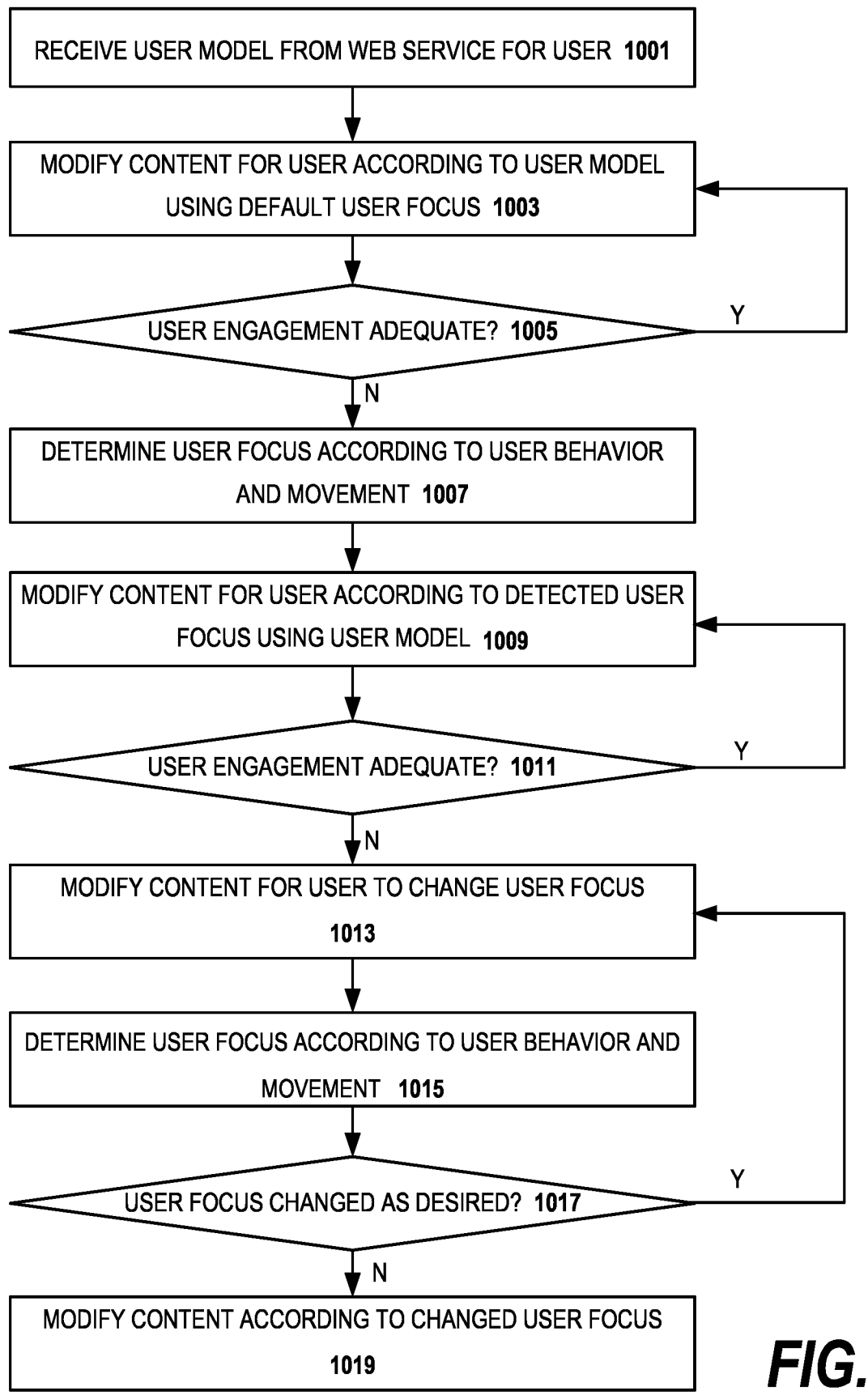
FIG. 10 is a flow diagram of a web content provider adjusting content according to an embodiment of the invention.

FIG. 10 depicts an embodiment of the invention. The process begins in step 1001 where the content provider receives a user model from the web service for the user. The web service may send a plurality of user models to the content provider for the user each user model for a particular content type. In step 1003, the content provider modifies content for the user according to user model using the default user metal focus included in the user model for the user for the particular content type.

In step 1005, the web content provider determines whether the user engagement is adequate, for example, by using eye tracking to determine that the user eye movement indicates that the priority user interface elements are receiving attention or by monitoring user behavior such as selecting the high priority content or a hyperlink associated with the content. If so, the web content provider continues using the default, learned user focus from the user model. If the user engagement is not adequate, the web content provider in step 1007 determines the current user focus according to user behavior and movement. This step is performed by the web service for the content provider in some embodiments. Thus, in step 1009, if the current user focus is different than the default user focus, the content provider changes the content for the newly detected user focus. This will typically entail a change in position of at least some of the user interface elements. The content for user is modified according to the user model received from the web service.

In step 1011, it is determined whether the user engagement adequate using the content created according to the detected user focus. If not, in some embodiments, in step 1013, the content provider modifies the content for the user in an effort to change user focus. The intent of this step is to present the content in a manner which will change the user focus type to be a more attentive one for the presented content. In step 1015, the content provider determines the current user focus according to user behavior and movement referring to the user model received from the web service. A decision, step 1017, is made whether the user focus changed as desired. If so, and if necessary, in step 1019, the web content provider modifies the currently presented and future content on this content type according to changed user focus.

Although the description of the interface is focused on a preferred embodiment, it can be used in any type of application, where individual elements of the interface are placed according to their importance and according to monitored measurements of user engagement.

The order of steps in which the method is described is not intended to be construed as a limitation, and any number of the described method blocks may be combined in any order to implement the method, or an alternate method. Additionally, individual blocks may be deleted from the method without departing from the spirit and scope of the embodiments of the invention.

One skilled in the art will understand that the division of tasks between the modules is exemplary, and that other embodiments of the invention will divide the tasks differently. Further, in describing exemplary processes below, the order in which the processes are described with reference to the flow diagrams is not intended to be construed as a limitation, and any number of the described method blocks may be combined in a different order to implement the method, or alternate method. Additionally, individual blocks may be deleted from the method without departing from the spirit and scope of the subject matter described herein.

The present invention has many advantages over the prior art. At a high level of generality, embodiments of the invention analyze the physical behavior of individual users when engaged in tasks with a computing device. Movements indicative of changes in user focus are detected and used to create a user specific model. The created user model is used to detect a user focus or a change in user focus. Based on that detected or predicted user focus, priority elements of the graphical user interface are moved within the interface to a position or region expected to elicit the user focus on the priority interface element. For example, if the user model for user B detects a distracted user focus, i.e. content blindness, for a content type located centrally in the screen and that the user model predicts that user B would have a deeper level of engagement for content X if that user would look up 30 degrees, the interface will change the position of the content (e.g., a mid-roll advertisement) for that user.

In embodiments, the changed content position results in a changed user focus of the user. Thus, with the movement of the interface element, a reflex action is engaged, e.g., the user looks up 30 degrees, which causes a new user focus for the user. That new user focus is associated with increased engagement with the relocated interface element, and thus, greater engagement is devoted to the content displayed therein. User models are specific to user, user group and content type in different embodiments.

Internet content providers are looking for methods to improve user's engagement level with article, video, and ad content. If a user has developed ad blindness and has become increasingly immune to a content provider's typical presentation methods, the user model of the present invention provides a means to predict where a priority interface element should be placed or moved to increase the effectiveness of the priority content for that user.

Embodiments of the invention use user models of user behavior, movement and focus to route content to the most attentive users. For example, if the analysis of user behavior indicates that user 2 is often associated with kinesthetic user focus, then naturally, haptic content might best be routed to user 2.

As most efforts to optimally position graphical user interface elements tend to be standard for all users of the web page, application or device, if only because it is troublesome and extremely error prone to manually understand what is optimal for a particular user, the invention provides an improved method for selecting and positioning content optimally for each user. In this description, the inventors describe a method for rendering content in a manner that is conducive to the end user readily processing the content (overcoming content blindness).

Embodiments of the invention are implemented in a social network application available to users via the Internet.

The invention is an improvement over the prior art in that it allows optimal content rendering based on the specific content and its relationship to the user focus of the individual user.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A method for modifying a user interface in a web browsing session comprising:
   during a learning session with a first user, creating a user model wherein the user model includes associating user movement of the first user with a plurality of user focus types, wherein each user focus type is for at least one of a content type, a user learning style or a web content provider for the first user;
   during the web browsing session with the first user, selecting a first user focus type from the plurality of user focus types in the user model to modify a web application user interface to present a priority user interface element in the user interface; and
   modifying the web application user interface according to the first user focus type.

2. The method as recited in claim 1, wherein each user focus type corresponds to a respective web content provider, and the method further comprises:
   prior to selecting the first user focus type, presenting the priority user interface element in the user interface at a first placement; and
   in the modifying, moving the priority user interface element in the user interface based on the first user focus type to a second placement.

3. The method as recited in claim 1, further comprising based on monitored user movement during the web session, determining a user focus type change of the first user from the first user focus type to a second user focus type; and
   using the determined user focus type change for the first user to move the priority user interface element in the user interface in a spatial direction according to the user model.

4. The method as recited in claim 1, wherein the priority user interface element is an advertisement.

5. The method as recited in claim 2, wherein the priority user interface element is presented in the user interface at the first placement according to a default user focus type for the first user in the user model wherein the default user focus type is for a habitual user learning style of the first user.

6. The method as recited in claim 2, further comprising:
   determining that an engagement of the first user at the second placement based on the first user focus type is inadequate; and
   responsive to determining that the engagement of the first user is inadequate at the second placement, moving the priority user interface element in the user interface to a third placement, wherein moving the priority user interface element is predicted by the user model to change a current user focus type from the first user focus type to a second user focus type.

7. The method as recited in claim 1, further comprising:
   determining that an engagement of the first user at the second placement based on the first user focus type is inadequate; and responsive to determining that the engagement of the first user is inadequate at the second placement, initiating a second learning session with the first user wherein the user model is updated for the first user focus type according to user movement of the first user during the second learning session.

8. The method as recited in claim 1, wherein the first user is a member of a user group and the user model is a user group model for a plurality of users who are members of the user group, the user group selected based on common user movement and user behavior.

9. Apparatus, comprising:
a processor;
computer memory holding computer program instructions executed by the processor for modifying a user interface in a web browsing session, the computer program instructions comprising:
program code, operative to create a user model wherein the user model includes associating user movement of a first user with a plurality of user focus types, wherein each user focus type is for at least one of a content type, a user learning style or a web content provider for the first user;
program code, operative during a web browsing session with the first user, to select a first user focus type from the plurality of user focus types in the user model to modify a web application user interface to present a priority user interface element in the user interface; and
program code, operative to modify the web application user interface according to the first user focus type.

10. The apparatus as recited in claim 9, wherein each user focus type corresponds to a respective web content provider, and the apparatus, further comprising:
program code responsive to selecting the first user focus type operative to present the priority user interface element in the user interface at a first placement; and
program code, operative to move the priority user interface element in the user interface based on the first user focus type to a second placement.

11. The apparatus as recited in claim 9, further comprising:
program code, operative to determine a user focus type change of the first user based on monitored user movement from the first user focus type to a second user focus type during the web session; and
program code responsive to the determined user focus type change for the first user to move the priority user interface element in the user interface in a spatial direction according to the user model.

12. The apparatus as recited in claim 9, further comprising:
program code, operative to perform a time series analysis to account for changes in the first user interests in time; and
program code, operative to use the time series analysis to modify the user model, wherein the modified user model is used to place the priority user interface element in the user interface.

13. The apparatus as recited in claim 9, further comprising:
program code operative to receive a request from a subscribing web content provider to receive the plurality of user models; and program code operative to send the plurality of user models to the subscribing web content provider.

14. The apparatus as recited in claim 9, wherein at least one of the user focus types in the user model applies to a content type and the content type is selected from a content format and a content subject.

15. A computer program product in a non-transitory computer readable medium for use in a data processing system, the computer program product holding computer program instructions executed by the data processing system for modifying a user interface in a web browsing session, the computer program instructions comprising:
program code, operative to create a user model wherein the user model includes associating user movement of a first user with a plurality of user focus types, wherein each user focus type is for at least one of a content type, a user learning style or a web content provider for the first user;
program code, operative during a web browsing session with the first user, to select a first user focus type from the plurality of user focus types in the user model to modify a web application user interface to present a priority user interface element in the user interface; and
program code, operative to modify the web application user interface according to the first user focus type.

16. The computer program product as recited in claim 15, wherein each user focus type corresponds to a respective web content provider, and the product further comprises:
program code responsive to selecting the first user focus type operative to present the priority user interface element in the user interface at a first placement; and
program code, operative to move the priority user interface element in the user interface based on the first user focus type to a second placement.

17. The computer program product as recited in claim 15, further comprising:
program code, operative to determine a user focus type change of the first user based on monitored user movement from the first user focus type to a second user focus type during the web session; and
program code responsive to the determined user focus type change for the first user to move the priority user interface element in the user interface in a spatial direction according to the user model.

18. The computer program product as recited in claim 16, wherein the user model applies to a user group of users and the method further comprises:
program code, operative to clustering users in user groups according to user movements and behaviors;
program code, operative to assign a cluster of users to a user group which uses the user model.

19. The computer program product as recited in claim 15, wherein each of the user focus types in the user model contains a set of rules for priority user interface element placement in the user interface, wherein the rules are based on a history of user behavior.

20. The computer program product as recited in claim 15, further comprising:
program code, operative to receive user input to create a set of parameters for a user profile; and
program code, operative to use the user profile parameters to create the user model.

* * * * *